Figure 3:
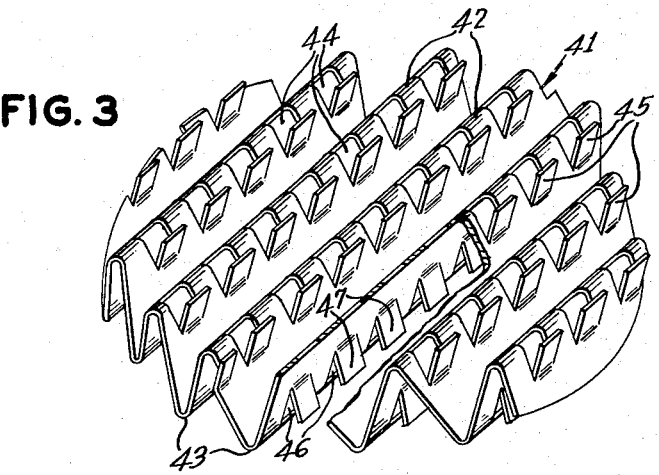

March 8, 1966     H. K. STRASCHIL ETAL     3,238,703
DIFFUSION PURIFICATION OF GASES
Filed March 7, 1963     2 Sheets-Sheet 1
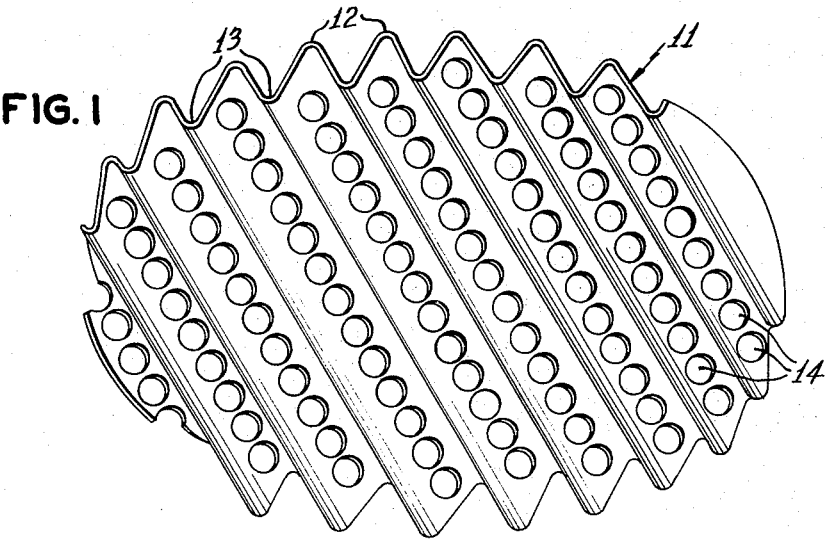
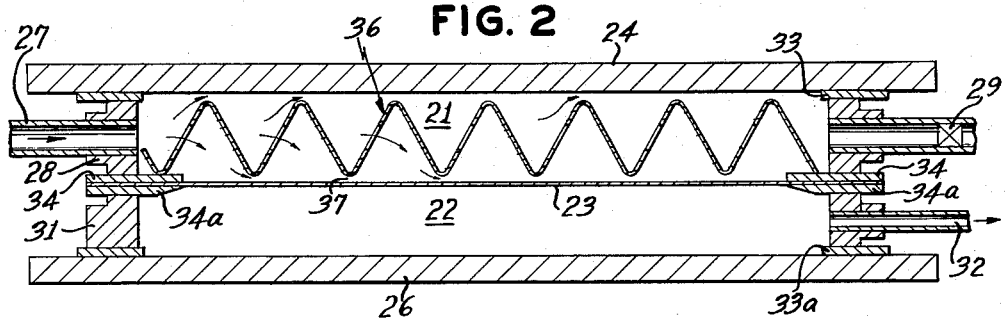
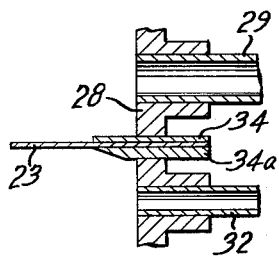
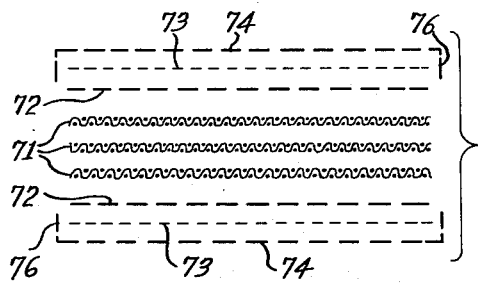
INVENTORS
HEINRICH K. STRASCHIL
THEODORE C. LOPEZ
BY
*Samuel Kahn*
ATTORNEY March 8, 1966  H. K. STRASCHIL ETAL  3,238,703
DIFFUSION PURIFICATION OF GASES Filed March 7, 1963  2 Sheets-Sheet 2

INVENTORS
HEINRICH K. STRASCHIL
THEODORE C. LOPEZ
BY
Samuel Kahn
ATTORNEY

_United States Patent Office_

3,238,703
Patented Mar. 8, 1966

3,238,703
DIFFUSION PURIFICATION OF GASES
Heinrich K. Straschil, East Orange, and Theodore C. Lopez, Irvington, N.J., assignors to Engelhard Industries, Inc., Newark, N.J., a corporation of Delaware
Filed Mar. 7, 1963, Ser. No. 263,635
2 Claims. (Cl. 55—158)

This invention relates to diffusion purification of gases and, particularly, to gas purification apparatus utilizing the selective diffusion properties of specific gases and materials employed as diffusion membranes. The invention is especially concerned with an improved apparatus for the separation of a gas from a mixture of gases by means of the selective diffusion of such gas through thin diffusion foils. More specifically, the invention relates to an apparatus for separating hydrogen in a high state of purity, the apparatus involving the use of a novel baffle for distributing the gaseous feed uniformly across the surface of a metal foil which is selectively permeable to hydrogen, as well as preventing the formation of an undesirable gradient of hydrogen concentration normal to the plane of the foil. As a result, the efficiency of the diffusion apparatus is remarkably improved.

The method of separating hydrogen from gaseous mixtures and purifying hydrogen by permeation through thin non-porous metal barriers of palladium or palladium alloys is well known. A variety of techniques have been hitherto devised for effecting such processes. For example, it is known to use thin tubes of hydrogen-permeable metal as the barrier means, the hydrogen-containing gases being contacted with one side of such tubes and pure diffused hydrogen being removed from the other side. Generally, hydrogen diffusion processes are effected at elevated temperatures and conditions which establish a hydrogen pressure differential across the diffusion barrier.

As an alternative to the use of thin metal tubes for diffusion separation and/or purification of hydrogen, techniques have been devised which employ thin sheets or foils of hydrogen-permeable metal. Procedures and apparatus have been disclosed in the art for positioning or disposing such thin metal films or foils in suitable diffusion apparatus, including means for reinforcing or supporting such thin films and foils so as to make practicable operating pressure differentials across such foil barriers of the order of several hundred pounds per square inch. For example, U.S. Patent No. 1,174,631 of Snelling discloses the use of thin platinum or palladium sheets disposed or supported upon porous backing materials such as porous earthware or Alundum. Porous backings which are sandwiched between suitable Group VIII metal diffusion barriers are disclosed in U.S. Patent No. 2,958,391 of A. J. de Rosset.

In general, foil type diffusers are assembled having one or more foils supported by a porous backing and sealed or gasketed around the peripheral edges of the foil to provide a leak-tight structure. Such diffusion apparatus is provided with inlet means for introducing hydrogen-containing feed gases to one side of the permeable foil or barrier, and outlet means for removing pure hydrogen which diffuses through the hydrogen-permeable barrier.

Although foil type diffusers have not been widely used commercially in comparison with tube diffusers, they have important advantages over tube diffusers. One problem in the operation of a foil-type diffuesr is the difficulty in providing good gas mixing at the upstream gas surface. The present invention provides an improved apparatus for such gas mixing.

The advantages of foil over tube diffusers include: (1) The possibility of operation with thinner diffusion membranes than tubes, e.g. 1 mil thickness or even less as compared to reasonable life in the present state of the art only with tubes about 3 mils or more in wall thickness; and (2) more ready disassembly and repair of foil diffusers than tube diffusers, since the former are sealed with gaskets and the latter by welding or brazing. As diffusion is inversely proportional to membrane thickness, use of such thinner foils is superior to use of the thicker tubes in potentially providing, for a given pure gas production, more compact design, and requirement for smaller size of pressure equipment, as well as a major saving of expensive diffusion membrane material such as Pd. Thus, assuming operation at the same pressure differential and temperature, a 1-mil thick foil diffuser requires only about a ninth as much metal as a 3-mil wall tube diffuser.

Foil-type diffusers of the aforementioned type may generally be stated to comprise one or more feed distribution zones, each of which zones is separated from a permeated gas collection zone by the permeable foil and its supporting structure. The combination of a feed distribution zone, a permeable barrier and a gas collection zone is for purposes hereof, referred to as a diffusion cell, and it should be understood that any particular diffusion apparatus will comprise one or more of such cells. The diffusion cell may be of any desired shape, e.g. rectangular or circular in cross section, and gas inlets and outlets can be provided at any convenient position. Generally, the feed distribution zone is provided with gas inlet and gas outlet means suitably arranged so that the hydrogen-containing gas flows under the applied pressure parallel to the diffusion membrane.

In the operation of such diffusion cells, it has been found that the unimpeded flow of feed gas through the feed distribution zone from a single feed gas inlet results in channeling of the feed gas along a linear path between the inlet and outlet ports, and prevents complete and uniform contacting of the feed gas with the entire surface area of the diffusion membrane. Stated otherwise, there are created in the feed distribution zone areas of stagnant or substantially stagnant gas which prevent contact of fresh feed gas with all of the exposed surface of the membrane and, as a result, the efficiency of separation of hydrogen by permeation is substantially reduced below the theoretical available diffusion coefficient of the permeable membrane surface in the cell.

It is recognized that the degree of stagnation of gaseous masses in the feed distribution zone is, to some extent, dependent upon the particular geometry of the feed distribution zone, and upon the rate of flow of gas therethrough. For example, if this zone were made long and thin enough, molecular motion of the gases might result in complete contact of all gas molecules with the membrane before the $H_2$ depleted gas is removed from the feed zone. Such is substantially the effect obtained in a thin-walled tubular barrier. However, the requirement of adequate flow at practicable operating pressure to provide economic recovery as a function of area of diffusion metal employed prohibits design of thin film feed diffusion zones. Similarly, these disadvantages might be overcome to some extent by providing multiple inlet and outlet ports in each of the feed zones of the cell, so as to break up the streamlined flow from a single inlet to a single outlet. The provision of such multiple connections for each distribution zone, with the attendant hazard of leakage, makes such a solution impracticable.

In accordance with the present invention, it has been found that the flow of feed gas through the feed distribution zones of a diffusion cell can be distributed by baffle means disposed within the feed distribution zone so as to utilize to a maximum the available permeable foil diffusion surface. An important function of the baffle means of this invention is to repeatedly direct the flow of feed gas toward the foil concomitantly with intermittent back-mixing in order to prevent the formation of an undesirable hydrogen concentration gradient normal to the plane of the foil. Thus the utilization of the feed gas is maximized. As a result, the efficiency of the diffusion cell is enormously increased.

Figure 4:
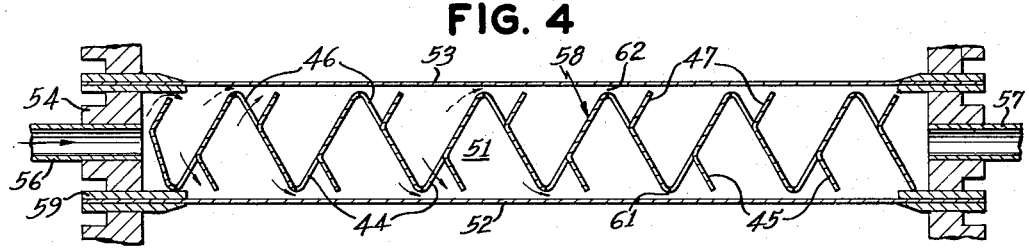
Figure 6:
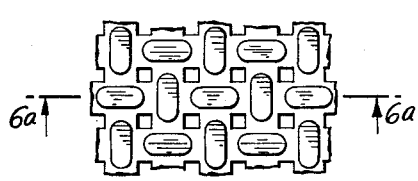
Figure 6A:

The invention will hereinafter be described in more detail in connection with the accompanying drawings, wherein FIGURE 1 is an isometric view of one form of baffle structure suitable for the purposes described herein, FIGURE 2 is a cross sectional view of a diffusion cell employing baffle means, FIGURE 2a is a detailed cross sectional view of a part of the diffusion cell shown in FIGURE 2, FIGURE 3 is an isometric view of another form of baffle suitable for the purposes described herein, FIGURE 4 is a cross sectional view of a symmetrical diffusion cell employing the baffle means of FIGURE 3, FIGURE 5 is an exploded view of the support pad described herein, FIGURE 6 is a top plan view of a support screen, and FIGURE 6a is a cross sectional view of a support pad.

In the practice of the present invention, a diffusion cell is employed having a feed distribution zone and a permeated gas collection zone. The feed distribution zone is provided with inlet and outlet means, and the collection zone is provided with outlet means, and advantageously with inlet means also. The latter is useful in the event it is desired to pass a sweep gas through the gas collection zone to remove permeated hydrogen, and/or to reduce the hydrogen partial pressure on the downstream side of the permeable membrane.

Interposed between feed distribution zone and permeated gas collection zone of the diffusion cell is a supported thin foil of non-porous, hydrogen-permeable metal. It is well known that certain metals of Group VIII of the periodic table are permeable to hydrogen and substantially impermeable to other gases and any suitable $H_2$ permeable metal known in the art may be employed. Thus, platinum, palladium, and alloys thereof have been hitherto employed for this purpose. Palladium and certain of its alloys, notably palladium-silver alloys containing about 10–40% silver have been used commercially for hydrogen purification by diffusion. Gold-palladium alloys, preferably containing from about 20 to about 40 atom percent of gold, boron-palladium alloys, preferably containing from small amounts up to about 10 atom percent of boron, ternary alloys, such as Pd-Ag-Au and Pd-Ag-Rh, and even four component alloys such as Pd-Ag-Rh-Ru have been proposed as suitable materials for fabrication of $H_2$ diffusion barriers.

In order to obtain a reasonable rate of diffusion for commercial use, it is necessary to operate with very thin diffusion foils and/or to maintain a large pressure differential across the diffusion membrane. It is obvious that the thinner the membrane, the less the pressure differential that can be tolerated between the upstream and downstream sides of the membrane without collapse or rupture thereof. It has been found that the rate of increase in the resistance to flow of hydrogen through hydrogen-permeable membranes as the thickness of the membrane increases is greater than the rate of increase in flow through the membrane with increase in pressure to rupture of the part. As a result, an increase in the thickness of the membrane to permit use of higher pressure differentials is not ordinarily effective in increasing the rate of flow of gas by diffusion through the membrane.

Consequently, and in order to achieve commercially useful flow rates in diffusion apparatus, it has generally been found advantageous to employ thin foils of hydrogen-permeable metal disposed upon rigid supporting structures. The present invention will be more fully described with reference to a diffusion cell employing such supporting structure for the foil, but it should be understood that the invention is broadly applicable to improved operation of a diffusion cell having a foil membrane which is not so supported. For example, it is known to operate a diffusion cell having unsupported foil membranes wherein the pressure on each side of the membrane is equalized by means of stripper gas introduced on the downstream side of the cell, the amount of stripper gas being controlled to maintain the pressure differential across the membrane within the rupture limits of the metal foil. The baffle means and method of operating with such baffle means as described herein may be advantageously used in such apparatus.

The particular structural feature of the present invention which provides exceptionally high rate of production from a diffusion cell of the aforementioned type is the provision of a baffle in the feed distribution zone of the cell to break up the stream-line flow of feed gas across the diffusion barrier, and repeatedly to direct the gas flow into contact with the permeable membrane concomitantly with intermittent back-mixing. The particular shape of the baffle which is employed for this purpose is not critical, provided it serves to mix and distribute the feed gas throughout the feed distribution zone and to direct the flow of gas in general toward the foil surface. Obviously, the baffle will be of such overall dimensions as to conform to the entire foil surface, and may be of the size and shape as dictated by the configuration of the diffusion cell. Thus, the baffle may be square or rectangular, in the case of cells having square or rectilinear configuration, or circular in shape to conform to the overall surface of the foil employed in a circular cell. While the particular shape of the baffle is not critical, it has been found that certain embodiments thereof as set forth herein provide an advantageous gas flow pattern as set forth above and provide a remarkable increase in the efficiency of the diffusion foil.

Where a sweep gas is used on the downstream side of the foil to improve the efficiency of hydrogen diffusion through the foil, it may be advantageous to employ a similar baffle in the gas collection zone of the diffusion cell.

Referring to FIGURE 1, there is shown in isometric projection a baffle structure which can be employed in the practice of the present invention. The baffle 11 is composed of a ridged metal member of circular cross section and having a corrugated structure consisting of alternating ridges 12 and valleys 13. As shown in FIGURE 1, each corrugation of the baffle is provided, on the side facing the inlet gas flow, with a series of openings 14, illustrated as circular, but which may, of course, be of any desired shape or configuration, e.g., square, elliptical, etc.

In operation, the baffle is interposed in the feed distribution zone of a diffusion cell which is, for the purpose of illustration, shown in cross section in FIGURE 2. In this figure, a diffusion cell is shown comprising a feed distribution zone 21 and a permeated gas collection zone 22, separated by diffusion membrane 23. End plates 24 and 26, suitably bolted together by bolts (not shown) provide a pressure-tight system, each serving as one wall of the aforementioned zones. Feed gas is introduced into chamber 21 by inlet 27 in stainless steel ring 28, which is provided with valved bleed 29. A similar ring 31 provided with $H_2$ outlet 32 serves to define the containing wall of the permeated gas collection zone 22. Each of rings 28 and 31 is in pressure-tight relationship to the end plates 24 and 26, and foil 23, the pressure seal being provided by copper ring gaskets 33, 33a, 34 and 34a. In the embodiment shown, gaskets 33 and 33a are 0.025″ copper rings, gasket 34 is 0.010″ thickness, and 34a is 0.005″ thickness, but the particular thickness is not critical, and any suitable gasketing materials may be employed for the purpose.

As shown in FIGURE 2, gasket 34 is of slightly larger width than the wall of ring 28, and thus provides a support for baffle plate 36 disposed within chamber 21 and resting upon the surface of gasket 34. Baffle plate 36 is fabricated as shown in FIGURE 1, and may be made of any material resistant to deterioration under hydrogen pressure at elevated temperature. The baffle plate, supported as shown, provides a passage 37 for flow of gas along the surface of the membrane 23, and is of such dimension as to provide a similar clearance, e.g., from about 0.010" and 0.030" from end plate 24. Thus, as shown by the arrows, free flow of feed gas through, under and over the baffle plate is provided, the shape and configuration of the baffle being such as to provide thorough mixing of gas in the feed distribution zone, as well as to channel flow of gas into contact with, and across the surface of, the diffusion foil 23. By use of such baffle means, and as shown by the data provided in Example I hereof, substantially theoretical efficiency of the membrane is readily attained.

In the construction of the diffusion cell, it has been found advantageous to avoid the shap edge of the gasketing material at the surface of the thin membrane, particularly on the downstream side of the membrane. The presence of such a sharp edge has a cutting effect on the membrane, and is often found to result in tearing of the membrane. Consequently, the gasket 34a, as shown in FIGURE 2a, is preferably feathered to a fine edge to provide a seal resistant to tearing.

The embodiment of the present invention as shown in FIGURE 1 is useful in promoting hydrogen diffusion from gases introduced into a feed distribution zone bounded on only one side by a permeable foil. In practice, a diffusion cell ordinarily consists of a number of feed distribution zones and permeated gas collection zones, assembled in sandwich construction, each feed distribution zone being bounded on each side by a diffusion foil and associated gas collection zone. In employing the baffle arrangement of the present invention in such apparatus, it is advantageous to provide a baffle which directs feed gas flow into contact with both permeable foil members of the feed distribution zone.

One embodiment of a suitable baffle for this purpose is shown in FIGURE 3. The baffle consists of a corrugated member 41 having alternate ridges 42 and valleys 43.

Referring to each corrugation there are shown a series of openings 44 at the bottom of each corrugation, and on the side toward the inlet gas flow. These openings are provided with deflectors 45, bent substantially parallel to the opposite side of the corrugation and adapted to direct flow of gas which passes through the openings 44 toward the lower surface of the baffle, in the direction of the membrane on this side of the baffle plate. Similarly, the side of each corrugation opposite the direction of gas flow is provided with a series of openings 46, each provided with deflectors 47 which direct gas flow passing through the openings in an upward direction, toward the membrane on the upper side of the baffle plate. The openings on the upper and lower side of each corrugation are preferably alternately disposed to avoid excessive channeling of gas flow.

Referring to FIGURE 4, a cross section of the baffle plate of FIGURE 3 is shown as disposed in a feed distribution zone bounded on each side by an $H_2$ permeable membrane. The gas distribution zone 51 bounded by permeable membranes 52 and 53, is defined by stainless steel ring 54 with inlet 56 and bleed line 57. Suitable ring gaskets, of copper, silver, gold, or other material provide pressure-tight seal between ring 54 and the diffusion membranes. Baffle plate 58 is disposed within the chamber 51 and rests peripherally upon gasket 59 providing a passage 61 for gas flow along the membrane surface. Suitably, gasket 59 is from 0.01" to 0.03" thickness, and the baffle plate of dimension to provide a similar gas passage 62 along the upper membrane 53. Openings 44 and 46 and deflectors 45 and 47 correspond to the same numbered members of FIGURE 3. The solid arrows show the flow of gas in the plane of the section, the dotted arrows indicating gas flow in a plane drawn behind the section. It will be noted that the baffle provides a mixing of gas in the feed distribution zone, as well as a directing effect which brings the gas flow into intimate contact with the membrane surfaces.

In the feed chambers for two-directional flow, the flow can be adjusted for greater uniformity over the total surface by controlling the hole size. For example, smaller holes may be used in the center region of the zone, and larger holes toward the periphery. The deflectors can be adjusted to obtain the desired degree of opening.

The baffles employed in the practice of the present invention can be fabricated from any suitable metallic or other material, the only limitation being that the material be sufficiently rigid to maintain its shape and unreactive with hydrogen under the temperature conditions normally employed for diffusion. Thus, suitable baffles can be fabricated from aluminum, magnesium, copper, stainless steel and the like. Stainless steel is preferred since it is strong, resistant to hydrogen attack, and readily fabricated to the desired shape. Non-metallic materials, for example, carbon, alumina, ceramic, etc. can be used for fabrication of the baffle.

The baffle may be constructed in the form of a perforated or porous sheet, or it can be a screen modified to a suitable shape. Where it is desirable to have a catalyst in a chamber which houses a baffle screen, such screens can be coated with catalyst, or the catalyst can be otherwise supported on the screens.

As set forth herein, the hydrogen-permeable foil is generally supported upon a metallic supporting structure to provide rigidity to the foil and sufficient strength to withstand the useful differential pressures across the diffusion barrier. Such supports are generally fabricated of a porous material, thus permitting removal of diffused hydrogen from the recovery zone of the diffusion cell. Suitable supports have been disclosed in the prior art, e.g., supports of porous alumina as described in Snelling U.S. Patent 1,174,681, and porous sintered metal matrices such as disclosed in De Rosset U.S. Patent 2,824,620.

A particularly useful support for the practice of the present invention comprises a wire mesh sandwich structure of the type disclosed and claimed in our copending application, Ser. No. 263,636, filed Mar. 7, 1963. Such a support, in a preferred embodiment, is fabricated from one or more coarse mesh metal screens, e.g., a 3–6 mesh screen, which are superimposed upon each other, the mesh layers being wired or brazed together to form a rigid supporting structure. The coarse mesh screen provides a simple, strong and effective 3-dimensional channel system providing a porous network through which diffused hydrogen readily flows on the downstream side of the foil barrier.

In the utilization of such a coarse mesh screen, it has been found essential to superimpose on the coarse mesh a finer mesh metal screen with which the foil is placed in direct contact. It has been found that the mesh size of this supporting screen is somewhat critical, since when the supporting screen openings are too small, the foil wrinkles and breaks during operation. At pressures of 25–250 p.s.i., a supporting screen of 16–32 mesh, preferably about 24 mesh, can be used in a weave which will provide from 30–60% open area. Preferably from 40–50% of open area is used. Surprisingly, it has been found that the use of screen of the indicated mesh size produces a dimpling effect as the foil is pressed against the support, and that the hydrogen absorbed by the foil, while normally causing expansion and cracking of the foil, causes expansion of the dimples in the foil without breakage. Advantageously, the foil-supporting side of the mesh is flattened, as by rolling, to avoid sharp creases at the top of each mesh wire. It has been found that interposing of a fine mesh screen, e.g. of 72 mesh, between the surface mesh and coarse supporting mesh, provides further cushioning effect of the dimples formed in the metal foil, and further prolongs the life of the diffusion foil.

Referring to FIGURE 5, there is shown an exploded view of a stainless steel wire screen support pad of the type described above. In the embodiment shown, three wire mesh members 71 of 4-mesh stainless steel wire form the main supporting structure. Optionally, a somewhat finer mesh screen 72 of 16-mesh is provided as a support for a very fine, mesh member 73, of about 72-mesh. Preferably, this member is rolled to provide a flattened surface upon which is supported a half, rolled and cup-shaped mesh member 74, of 16–32 mesh, preferably 24 mesh, as shown in the figure. The diffusion foil is directly supported upon the flattened surface of this member. In order to avoid damage by the ends of the wire of which the member is constructed, the ends of the mesh are turned down, as shown at 76. The surface of screen 74 is shown in detail in FIGURES 6 and 6a, the flattening being obtained, for example, by passing the mesh, together with a soft gasketing material, through a two-roll mill under adequate pressure to obtain the desired flattening. The entire assembly shown in FIGURE 5, suitably assembled into a rigid assembly as by brazing, welding or wiring the supporting screens to each other is inserted into the diffused gas collection zone of a diffusion cell. The assembled supporting structure is properly dimensioned and fitted into the chamber so as to provide the necessary support for the foils.

EXAMPLE I

In order to demonstrate the advantage of employing a baffle in the feed distribution zone of a hydrogen diffusion cell, apparatus of the type illustrated in FIGURE 2, but having two feed distribution zones containing unsymmetrical baffles, was employed for the separation of hydrogen from a mixture of 50% $H_2$ in $N_2$. Two foils consisting of a total of 330 cm. of Pd-25 Ag was used in the apparatus. In Run 1 in the following Table I, operation was effected in the absence of baffles while, in Run 2, a baffle of the type shown in FIGURE 1 was inserted into the feed distribution zones.

In the table, the recovery factor ($r$) is determined as the ratio of pure $H_2$ out/$H_2$ in $\times 100$, and is found by analysis of the input gas and bleed gas and measurement of the rate of gas flow out of the feed distribution zone and out of the recovery zone.

In order to determine the efficiency of the separation, an efficiency factor was calculated as the ratio of actual recovery to theoretical recovery, where the theoretical recovery factor is calculated from the measured permeability with pure hydrogen, taking into account the decrease in the partial pressure of hydrogen upstream of the foil, on the basis of this correlation.

This formula follows a permeability relationship of Borelius and Lindblom, Ann. Phys., Lpz., 82, 201 (1927) derived from an earlier formula of A. Sieverts for the solubility of $H_2$ in metal. The subject is discussed in "Diffusion In and Through Solids," by Richard M. Barrer (1941) on page 171.

The given equation for $dr$ in combination with two material balance equations, for total gas flow and for hydrogen flow, is developed to give the theoretical recovery factor of Table I.

$$dr = \frac{K'}{F_0 x_0}(P_U^{1/2} x^{1/2} - P_D^{1/2}) dA$$

$F_0$=total flow in
$x_0$=hydrogen mol fraction in feed gas
$x$=hydrogen mol fraction upstream
$P_U$=pressure upstream
$P_D$=pressure downstream
$K'$=permeability constant at constant temperature and foil thickness
$A$=Area
$r$=recovery factor, pure $H_2$ out/$H_2$ in
Efficiency=actual/theor.

TABLE I

| Run | $H_2$ in $N_2$% | $\Delta P$ p.s.i. | $H_2$ in 1/h | $H_2$ out 1/h | $H_2$ in bleed percent | $r$ Theor. percent | $r$ Actual percent | Efficiency percent |
|---|---|---|---|---|---|---|---|---|
| 1 | 50 | 50 | 290 | 98.6 | 39.8 | 63.8 | 34.0 | 53.3 |
| 2 | 50 | 50 | 290 | 173.7 | 28.6 | 63.8 | 59.9 | 93.9 |

The efficiency of the separation is shown by the above data to be about doubled in the same diffusion cell by the simple expedient of inserting appropriate baffle means in the feed distribution zone of the cell. Indeed, by means of the baffle, the efficiency closely approaches the theoretical maximum efficiency of the unit, i.e., the rate of hydrogen separation is diffusion controlled.

EXAMPLE II

In this example, a diffusion cell utilizing a baffle of the type shown in FIGURE 3, and a screen support as shown in FIGURE 5, was employed for the separation of $H_2$ from an $N_2$–$H_2$ mixture. The cell provided a palladium-25 silver area of 142.5 cm.$^2$, and two were employed in the cell. Each foil was 1.0 mil in thickness, supported on a screen support. The data for a series of runs at varying pressure differential across the barrier (in each case downstream pressure was approximately 1 atmosphere) are given in Table II.

TABLE II

| Run | Temp.: 500° C.; Gas Mixture, Percent $H_2$ in $N_2$ | Area: 142.5 cm $^2$. | | | Downstream pressure: approx. atmosphere | | | |
|---|---|---|---|---|---|---|---|---|
| | | $\Delta P$, p.s.i. | $H_2$ in 1/hr. | Pure $H_2$ out 1/hr. | $H_2$ in bleed percent | $r$ Theo. percent | $r$ Actual percent | Efficiency percent |
| 3 | 50 | 60 | 154.5 | 95.1 | 27.8 | 67.0 | 61.6 | 92.0 |
| 4 | 50 | 75 | 195.8 | 125.2 | 26.5 | 71.1 | 63.9 | 89.9 |
| 5 | 50 | 100 | 140.0 | 112.7 | 16.3 | 83.8 | 80.5 | 96.1 |
| 7 | 50 | 100 | 225.5 | 159.1 | 22.7 | 77.3 | 70.6 | 91.3 |
| 6 | 50 | 100 | 354.9 | 196.2 | 30.9 | 61.7 | 55.3 | 89.6 |
| 8 | 50 | 100 | 485.4 | 215.8 | 35.7 | 49.4 | 44.5 | 90.1 |
| 9 | 75.8 | 100 | 571.8 | 354.5 | 54.3 | 66.8 | 62.0 | 92.8 |

$r$=recovery factor, pure $H_2$ out/$H_2$ in.
Efficiency=$r_{actual}/r_{theo}$.

It will be noted that the efficiency in each case was about 90% or better. At any given pressure, the efficiency shows a slight decrease with increased flow rates, as might be expected since the contact time decreases.

An increase of over 300% in flow rate (at 100 ΔP), however, resulted in relatively minor reduction of efficiency. In the absence of a baffle in the feed distribution zone, substantially lower efficiencies, similar to that shown in Run No. 1 are obtained.

While the invention has been described with particularity in relation to certain preferred embodiments, it will be apparent to those skilled in the art that various modifications thereof can be employed without departing from the spirit and scope thereof.

What is claimed is:

1. An apparatus for separating hydrogen from a mixture of gases containing hydrogen which comprises in combination a diffusion cell consisting of an inlet chamber and a diffused gas outlet chamber, said chambers being separated by a non-porous hydrogen-permeable foil containing palladium, said inlet chamber containing an inlet for said mixture of gases and an outlet for non-permeated gases in said mixture and corrugated baffle means disposed within said inlet chamber being elongated in a direction generally parallel to the foil for repeatedly directing the flow of feed gas within said chamber toward said foil, said inlet being located to provide for inlet gas flow in said same generally parallel direction, each corrugation of said baffle means being provided on the side facing the inlet gas flow with a series of discrete openings, said baffle means being of cross-sectional area transverse to the flow of inlet gas substantially equal to the cross-sectional area of the inlet chamber and being supported in spaced relationship from said foil to provide a passage between about 0.010 inch and 0.030 inch for flow of gas along the surface of said foil.

2. The apparatus of claim 1 wherein the baffle means is provided with a series of discrete openings in each side of the corrugations and having a deflector adjacent each opening to direct gas flow toward the diffusion membrane.

References Cited by the Examiner

UNITED STATES PATENTS

| | | | |
|---|---|---|---|
| 2,514,623 | 7/1950 | Brown | 55—487 |
| 2,540,152 | 2/1951 | Weller | 55—16 |
| 2,627,933 | 2/1953 | Teter | 55—158 |
| 2,735,812 | 2/1956 | Van Hoek | 204—301 |
| 2,945,559 | 7/1960 | Buckman | 55—500 |
| 2,958,657 | 11/1960 | Binning et al. | 210—23 |
| 2,966,235 | 12/1960 | Kammermeyer | 55—16 |
| 3,016,345 | 1/1962 | Price | 210—23 |

FOREIGN PATENTS

| | | |
|---|---|---|
| 655,632 | 1/1963 | Canada. |
| 1,257,087 | 2/1961 | France. |

REUBEN FRIEDMAN, *Primary Examiner.*